United States Patent [19]

Hinterwaldner

[11] 4,362,566

[45] * Dec. 7, 1982

[54] ONE-COMPONENT HARDENABLE SUBSTANCES STABLE TO STORAGE AND ACTIVATABLE BY MECHANICAL AND/OR PHYSICAL FORCES AND METHOD OF PRODUCING, ACTIVATING AND APPLYING SAME

[76] Inventor: Rudolf Hinterwaldner, Dachsberg 19, 8019 Moosach, Fed. Rep. of Germany

[*] Notice: The portion of the term of this patent subsequent to Jul. 18, 1995, has been disclaimed.

[21] Appl. No.: 884,395

[22] Filed: Mar. 8, 1978

[30] Foreign Application Priority Data

Mar. 10, 1977 [DE] Fed. Rep. of Germany ....... 2710548

[51] Int. Cl.³ .............................................. C08J 9/32
[52] U.S. Cl. .................................... 106/85; 523/219; 428/321.5; 252/316; 106/90; 106/97
[58] Field of Search .................. 106/97, 314, 315, 85; 252/316; 428/304, 305, 306, 307, 308; 241/2, 22

[56] References Cited

U.S. PATENT DOCUMENTS

| 2,655,453 | 10/1953 | Sandberg | 428/914 |
|---|---|---|---|
| 3,395,105 | 7/1968 | Washburn | 428/306 |
| 3,649,317 | 3/1972 | Houseknecht | 106/314 |
| 3,764,357 | 10/1973 | Bowles et al. | 106/97 |
| 3,955,025 | 5/1976 | Matsukawa | 428/306 |
| 4,036,301 | 7/1977 | Powers et al. | 106/315 |
| 4,038,445 | 7/1977 | Robertson | 282/27.5 |
| 4,101,501 | 7/1978 | Hinterwaldner | 428/308 |

FOREIGN PATENT DOCUMENTS 2536319  2/1977  Fed. Rep. of Germany ...... 428/308

OTHER PUBLICATIONS

Belgian Patent 844,750 of 11/16/76 as abstracted in Derwent (Hinterwaldner).

Primary Examiner—Brian E. Hearn
Attorney, Agent, or Firm—Toren, McGeady & Stanger

[57] ABSTRACT

Hardenable one-component substances composed of hardenable components and an activator wherein one of the components is contained in a reaction hindering protective casing to inhibit hardening until use are disclosed wherein, as an additional component, hollow microspheres are included. The microspheres provide increased stability to storage of the composition as well as enhance the rupture of the protective casing during activation and application of the substance and also provide a low specific gravity to the component. Methods for preparing and using the substances are also disclosed.

21 Claims, No Drawings

ONE-COMPONENT HARDENABLE SUBSTANCES STABLE TO STORAGE AND ACTIVATABLE BY MECHANICAL AND/OR PHYSICAL FORCES AND METHOD OF PRODUCING, ACTIVATING AND APPLYING SAME

BACKGROUND OF THE INVENTION

1. Field of the Invention

This invention relates to a one-component hardenable composition that has good storage stability and is activatable by the application of mechanical and/or physical forces. These compositions are composed of monomeric, oligomeric, and/or polymeric compounds and one or more components that effect hardening, i.e., hardening agents, whereby at least the monomeric, oligomeric or polymeric and/or the component or components effecting hardening are contained in a reaction-hindering protective casing. The composition may, if desired, also contain other conventional additives. An object of the invention is also a method of producing, activating and applying such activatable one-component substances.

2. Description of the Prior Art

Reactive two- and more-component hardenable substances are known and conventional. In general, these are systems in which the compounds that react with each other are stored in separate packages and are only brought into contact shortly before application by mixing said components together.

The hardening of such reactive two- or more-component substances into high-grade materials is also known, e.g., bonding agents. However, these systems also have a number of negative features which make these compositions unavailable for extensive application in many engineering and artistic fields. These negative features are:

critical mixing ratios are required, errors in mixing often result, short or too long pot and processing times are often encountered, larger amounts of components result in strongly exothermic reactions, hardening periods are too long, time-consuming and/or expensive two- and more component dosing and mixing equipment required, many of the reactive materials may be physiologically harmful.

Much effort has been made in recent years to overcome these negative features by the development of one-pot or one-component systems with analogous properties. In several fields these efforts have been partially successful, particularly with regard to one-component systems that react to atmospheric humidity, such as, those based on silicone rubber, polyurethane and polysulfide. However, for various reasons, many two- and more component systems do not lend themselves to reformulation into humidity-hardening systems. Irrespective thereof, humidity-hardening systems have, among other things, the negative features that the vulcanizing and hardening rates are very slow (several days), which, in turn, depends on the thickness of the layer of the material and/or the relative humidity of the ambient air.

For this reason, endeavors have been made on a broader front to eliminate these and other negative features by placing one of the reactant media and/or reaction initiators in reaction-hindering protective casings. The encasing with chemically inert wall materials is effected either in a liquid or a solid phase. Today, known encapsulating technologies, particularly, microencapsulating techniques are resorted to in order to obtain pourable products having a small grain size. For this reason, reference will hereinafter be made to microcapsules and microencapsulated materials, although, in general, protective casings are meant.

To obtain a temporarily effective reaction hindrance, the protective casing must fulfill a multiplicity of requirements. For this reason, new parameters have been created for the application of microencapsulated materials. These new parameters are based on the requirement that the protective casings, and/or wall materials, must be, depending on their prospective application:

chemically inert to the internal and external phase, resistant to diffusion, and resistant to breakage, elastic or flexible and/or stable to temperature.

In order for the protective casings and/or wall materials of the microcapsules to fulfill the above and other requirements, they are subjected to various types of after-treatments. These after-treatments of the microcapsule walls entail shrinkage and hardening methods as well as the formation of secondary walls on the protective casings or other treatment. While unbreakable, diffusion-resistant and storage stable protective casings can be produced by such methods, they do have the negative feature that in the application of the substances contained therein, said capsules are difficult to break open or destroy. This pertains particularly to capsule ranges of under 600 m$\mu$, and particularly under 300 m$\mu$. With the smaller capsule sizes, not even greatly increased pressures and/or shearing forces are sufficient to destroy the walls and release the contents.

In addition, there are no simple means and devices available in industrial practice that are capable of generating the high pressures required to break the protective casings, notwithstanding the fact that such tools, materials and similar means could be heavily deformed and damaged in the process.

There is a further disadvantage in the production and storage of substances that contain microencapsulates. This applies particularly to substances based on systems of high viscosity, thixotropy and/or a high degree of filler, and particularly such substances with granular and/or sharp edged filling materials.

The shearing forces generated and often necessary during the mixing process are so great that they crack open a portion of the protective casings and the released reactive materials then can initiate undesirable premature reactions. When storing substances, in particular those containing specifically heavy filling materials, analogous partial capsule destruction can be observed because the substance's own high weight presses against the walls of the protective casings and exceeds the resistance to pressure of said casings.

The above described and other negative features of the known one-component systems that contain microencapsulated reactants may essentially be summarized as follows:

1. As a result of high friction, temperatures and similar causes, partial microcapsule breakage occurs during the incorporation of microencapsulates into a mixture.
2. During the storage of substances that are filled with specially heavy filling materials, capsule breakage occurs as a result of the weight of the material itself.
3. The time and temperature-dependent mechanical and/or physical forces at the point of application are in many cases inadequate to effect a suitable amount of microcapsular rupture.

In the German laid open application DT OS No. 2 626 603, polysulfide substances are described that contain microencapsulated cross-linking and/or vulcanizing agents. These vulcanizing agents are known materials, such as, lead dioxide, manganese dioxide, zinc peroxide, cumol hydroperoxide and similar substances. Such microencapsulated vulcanizing agents containing polysulfide substances are one-component hardenable materials and are intended to facilitate application of the material at the processing or work sites.

The homogeneous distribution of the vulcanizing agent in a reaction-hindering protective casing should guarantee that the activated substances supply vulcanizates into building expansion joints which, in contrast to two-component systems known today, can be exposed to stress at an early stage. Furthermore, the above referenced application sets forth that the microcapsule size should not be less than 400 m$\mu$, and preferably not less than 600 m$\mu$, because too small a capsule is difficult to destroy. In addition, these sealing compounds should be provided with an about 10 to 20% excess of crosslinking and/or vulcanizing agents, to ensure that all of the SH groups of the polysulfide polymer are oxidized.

On the other hand, too large a microcapsule size results in an unfavorable degree of distribution of the hardener and/or vulcanizing agent in the substance and can be partially destroyed when it is mixed into the substance. As the quota of destruction in the mixing process is not calculable, the quality of product produced by this process is a matter of chance and can vary.

The activation proper takes place in an activating device. Said activating device is composed of a chopper and a screw conveyor arranged behind the injection nozzle of a spray gun. Industrial practice, however, has made it evident that such a mechanical device is not sufficient to attain a high capsule shattering quota. On the average, it is around less than 60%. But to obtain reproducible vulcanites with constant properties, a capsule shattering quota of greater than 80% and preferably more than 90% is necessary. A further economic disadvantage is produced by the application of microspheres sized less than 400 m$\mu$, since the technology known at the present time for the microencapsulation of such agents inherently provides a considerable amount of microcapsules sized less than 400 m$\mu$ which cannot be utilized.

In the German laid open application DT OS No. 2 536 319, a new approach is described for the first time specifying how such microencapsulated materials containing one-component substances can be produced, activated and applied. The teaching of this invention is based on the incorporation of inorganic and/or organic hollow microspheres into these substances where they effect the following functions and/or duties:
1. A defined protective function in regard to the microcapsules during production.
2. The activation of this reaction system is effected by the mechanical and/or physical forces acting upon the substances destroying the hollow microspheres and producing jagged and angular destruction products which break or crack the microcapsule walls.

Industrial practice made it evident that with such substances, a multiplicity of simpler application problems can be solved and innovated. However, on the other hand, there are forms of application in which jagged and/or pointy products of hollow microsphere destruction are a hindrance, because they result in;
(a) rough surfaces and/or
(b) modified ultimate properties which may deviate from those desired in the thoroughly vulcanized end products.

This is particularly so in the case where the hollow microspheres as filler materials should simultaneously give a low specific gravity to the end product.

SUMMARY OF THE INVENTION

It is the aim of the present invention to provide improved one-component substances which, by means of reaction-hindering protective casings, contain inactivated reactants that do not display the aforementioned negative features, as well as the production, activation and application of same.

The problem of the present invention is solved in that the activatable one-component substances—in which at least one of the reaction members, initiators and/or accelerators present is contained in a reaction-hindering protective case or casings which are destroyable by mechanical and/or physical forces of the type and magnitude conventionally employed in using or applying such one-component hardenable substances-contain such hollow microspheres which, upon application of mechanical and/or physical forces, are stable and do not shatter, but rather retain their hollow sphericity. According to this invention, these hollow microspheres are, on the one hand, "protective agents" during the production and storage stages of such substances, and, on the other hand, act as casing rupturing means during application of the substance. The stable hollow microspheres according to this invention are, furthermore, filling materials that give the substances of this invention low specific gravity.

DESCRIPTION OF THE PREFERRED EMBODIMENT

The stable hollow microspheres according to the present invention may be manufactured of organic and/or inorganic materials in a conventional manner. They are preferably of hollow globular form. The inorganic hollow microspheres may be made of glass, inflated and/or expanded mineral filling materials, such as, fly ash, perlite, silicate, etc., calcium-, magnesium-, boron silicates and similar materials. The organic hollow microspheres consist of plastic materials, such as, duroplasts, e.g., amino- and phenol plasts, which substances are well-known. The hollow space of the hollow microspheres can, if required, be filled with inert gases, e.g., nitrogen.

The grain sizes of the stable hollow microspheres may vary within wide ranges and their diameters are generally less than about 3,000 m$\mu$, and preferably less than 1,500 m$\mu$. They furthermore have low bulk weights and low specific gravity that are preferably less than about 1.0 g/cm$^3$, and particularly less than 0.8 g/cm$^3$. In any event, the specific gravity is lower than the specific gravity of the substances in which they are contained.

The added quantities of the hollow microspheres may likewise vary over wide ranges and they preferably lie between about 0.5 and 700% by weight with regard to the unfilled basic raw materials. The content of stable hollow microspheres is, in addition, dependent on the content of the microcapsules, on the necessary protective casing, rupturing capacity and the requisite properties of the end products. However, the one-component substances contained in the microencapsulated materials according to this invention ought to at least display a hollow microsphere content between about 1 and 100, and preferably between about 3 and 70% by weight based on the weight of the unfilled basic materials.

The hardenable one-component substances according to this invention may be composed of inorganic, metallo-organic and/or organic bases. Such hardenable one-component systems are well known both in terms of methods of preparation and use. The may be present in liquid, pasty, thixotropic, semi-solid and/or solid form. As inorganic monomeric, oligomeric or polymeric compounds are suitable, among other things, hydraulic setting substances, cements, such as, Portland, alumina cement; gypsum, anhydrite, magnesite, lime, silicates, such as, waterglass. The metallo-organic systems include, among other things, silicon- and/or titanium organic compounds, such as, organosiloxanes, silicon resins, silicon rubbers and alkyltitanates. For the reactivatable one-component substance based on organic monomeric, oligomeric and/or polymeric bases, suitable reactive compounds are those which can produce cross-linked polymeric and/or elastomeric compounds by polymerization, polycondensation and/or polyaddition reactions. Included in this group are vulcanized neutral and/or synthetic rubber and elastomeric systems, such as, butadiene-acrylonitrile copolymerizates, butadiene-styrene copolymers, polysulfides; amino and phenoplasts, such as, ureamelamine-, phenol- and/or resorcin-aldehyde condensates; compounds containing vinyl and/or diene groups, such as, acrylic and/or methacrylic acid, their esters, amides, nitriles and derivatives thereof, unsaturated polyester resins; epoxide compounds and polyepoxides, such as, aromatic, aliphatic and cycloaliphatic epoxide resins, glycidylester, glydidylether; polyurethanes and other isocyanate cross-linkable systems; polyamines, polyamides, polyimines, polyimides and their derivatives and similar materials.

As used herein, the term "components facilitating hardening" or "hardening agent" refers to reaction initiators for the individual vulcanization-polymerization-polycondensation and/or polyaddition systems. In other words, these are reactive compounds that can initiate reactions. Beside coreactions, this includes, among other things, hardeners, such as, polyamines, polyamidoamines; known radical formers, such as, peroxides, hydroperoxides, per acid, their derivatives and salts; oxidation agents, such as, lead oxide, manganese dioxide, isocyanates and their derivatives; and mercaptane and mercapto compounds.

According to the present invention, these components also include solvents which may be applied to reactivate dry films by swelling and/or dissolving physically hardening systems.

Reaction accelerators are components that facilitate hardening and, as used herein, refer to compounds that give off electrons easily and thereby can effect such tasks as accelerated peroxide decomposition. This includes primarily heavy metal salts, amines, amides, imines, imides, mercaptanes, azo compounds and the like. This also pertains to catalysts, etc.

Auxiliary agents also belong to this category, as far as these materials must remain inactive during storage, because they can evaporate and/or react with other materials. They should effect modifying properties in the substances only during and/or after application. Such agents may be preserving means, hydrophobic agents, hardening retarders and/or accelerators for hydraulically setting substances, cross-linking agents levelling means, etc.

With the present invention, it becomes possible that reactions of highly reactive materials which are normally difficult to control due to too short pot or processing times, can be formulated and used due to the temporarily effective inactivation of the protective casing. Among other things, one-component systems can be produced that are reactive and harden at temperatures below 0° C.

The reactivatable one-component substances containing microencapsulated reactive materials according to this invention are constructed in such a way that they remain inactive during production and/or storage. Which of the reactive components of a given system is temporarily inactivated by protective casings so that it can be mixed together with other reactants, depends on the particular encapsulating technology involved, the type of application and economic factors. Preferably, that reactive material which is present in smaller quantities is contained in protective casings. For this reason, for some of the reactivatable one-component systems, components effecting hardening, preferably reaction initiators and/or reaction accelerators are used in microencapsulated form.

The substances according to this invention may be modified by other adducts. Suitable are plasticizers, oils, tars, asphalts, bitumens, solvents, dyes, pigments, thixotropic agents, inorganic and/or organic filling materials and fibers. Furthermore, stabilizers and/or inhibitors may be added.

The microhollow spheres, microcapsules and/or fillers applied in the substances of this invention may, in addition, be coated with substances forming adhesive bridges, such as, silanes, chrome complexes, in order to obtain reinforced bondings at the interfaces. To inactivate them against chemical sorption processes, they may be coated with fatty acids, fatty acid esters, or substances improving friction, such as, hydrocarbon fluoride, graphite and the like.

To prepare the substances according to this invention, conventional mixing machines which do not generate any excessively high shearing forces and/or friction in the materials being handled during the mixing process are suitable. This applies to planetary mixers, tumbling mixers and worm or screw mixers.

In the production and subsequent storage of the one-component substances according to this invention, the stable hollow microspheres assume a protective function, as has surprisingly been observed, if their hollow sphere size is approximately the same as or larger than the average microcapsule size.

In this invention, the protective function of the microhollow spheres, in contrast to the microcapsules, is based on the fact that on the one hand they act as spacers and on the other hand as buffers or "adsorbents" against the static forces of the composition itself, e.g., its own weight, particularly with specifically heavy filling materials. Said protective function is, among other things, a result of the stable hollow spherical form and the low specific gravity. Simultaneously, the microhollow spheres are good sedimentation hindrances and/or retarders in the one-component substances according to this invention and, in addition, the accumulation in localized spots within the composition of microcapsules is forestalled.

The protective function of the microhollow spheres of this invention during the production and storage of these one-component substances is readily shown by using solid glass pellets of identical size and identical volume as a comparative microhollow sphere in the same composition. The microspheres of glass have bulk weights of 1.3 to 2.5 g/cm$^3$. Upon application of these microspheres, partial capsule destruction occurs during the initial mixing in a mixing machine and the reactants and/or hardeners that issue forth begin to cause polymerization.

In a comparative experiment where glass pellets or microhollow spheres of identical size and volume along with sharp-edged and pointy particles are incorporated into the mixture in such a manner that no capsule breakage will occur during said manipulation yet, when these substances are subjected to normal storage conditions, the following is observed.

After a storage period of only 12 hours, the substance containing glass pellets only displays nests of hardened polymer and is depth-hardened after 48 hours. Surprisingly, however, after six months of storage, the substance containing the microhollow spheres possesses the same rheological properties as on the date of production.

In another method of comparison, the difference in weight resulting from the different specific gravities of the glass pellets and of the microhollow spheres was compensated for by adding a weight on top of the substance containing the microhollow spheres. After six months of storage, this substance too, showed neither any change in rheological properties nor was any localized polymerization present.

A further aim of the present invention is a method to activate, harden and/or accelerate the one-component substances before, during and/or after application, i.e., use. The stable microhollow spheres assume and solve a further problem in this respect in that, upon application and/or in the presence of the usual mechanical and/or physical forces applied to the substances when used, the microhollow spheres have the effect of grinding and/or frictional bodies, analogous to the grinding principle of a ball mill. The protective casings in the substances are ruptured by the grinding and frictional forces and the encased materials are set free, whereby the reaction is initiated. In order to generate high capsule rupturing capacities, the preferable microhollow sphere mixtures are those whose grain size spectrum is similar to that of the microcapsules.

Essentially, the activating process is based on that fact that upon application and/or in the presence of mechanical and/or physical forces, the one-component substances and the stable microhollow spheres are subjected to motion as a consequence of this dynamic force, the walls of the protective casing are broken and cracked. This prevailing "ball mill effect" is furthermore enhanced by hard, specifically heavy filler particles, which optionally may be present in the substance. The mechanical and/or physical forces can be generated by pressure, shearing, rotation, and/or torsion. Pressure forces are preferably generated by pressing, smoothing, stamping or beating. Shearing forces are preferably generated by agitating such substances in high-speed homogenizing machines, mills, extruders, kneaders, etc. Rotational and torsional forces are generally present where the substances are put into a turbulent current by pressure or where worm or snail-like elements rotate them.

As a result of the ensuing friction, activation is facilitated and accelerated. In general, mechanical destruction devices may additionally promote the activating function of the stable microhollow spheres in the one-component substances, which ensures a high proportion of capsule destruction.

In order to ensure an adequate activation capacity of unfilled or of one-component substances filled with soft filler material, at least about 5% by weight of stable microhollow spheres are essential with reference to the monomeric, oligomeric or polymeric substance. If, on the other hand, there are in addition, sharp-edged and-/or pointy filler particles present in the one-component substance and a low activation capacity is called for, then a minimal content of 1% by weight of stable microhollow spheres is sufficient with regard to the monomeric, oligomeric and/or polymeric substance.

A further aim of the present invention is the utilization of the activatable one-component substance of this invention in many fields of engineering, industry, commerce, the trades, for hobbyists, etc.

The composition, reactivities, activatabilities, rheological properties, and technical values in hardened and depth-hardened condition of these activatable one-component substances may be adapted to the respective specific processing technologies and forms of application. It is also possible to make available more universal reactivatable one-component substances for multiple fields of application.

The one-component substances of this invention can be stored for several months if packed in tubes, cartridges, cans, large tins, etc. The respective substances can be used for adhesive, bonding, sealing, surfacing, filling, consolidating and/or coating purposes.

In addition, the reactivatable one-component substances of this invention are suited for pattern and/or tool-making as well as for the production of pressed, hollow and/or injection molded component parts.

If the hardenable substances are based on duroplasts, their hardening products provide relatively high mechanical strength, good dimensional stability and relatively dense structures which are then preferably manually and mechanically workable with cutting tools, if the proportion of microhollow spheres is high and the content of hard, coarse-grained filler is low.

The activatable one-component substances of the present invention have a great many well-known industrial and domestic uses. Thus, with such materials, other materials, structures, substrates, etc., can be joined together, compacted, levelled and/or coated. When applied as tamping and/or filling means, cavities, such as, holes, shrinkage faults, etc., can be filled up. The materials and/or substrates may be metals, such as, steel, iron, aluminum, copper; inorganic materials, such as, stone, concrete, glass, ceramics; elastomers; plastics, such as, thermoplasts, duroplasts; wood and wooden materials; plastic film, plastic laminate; textiles, paper, carton, and the like.

Such problems as bonding, compacting, levelling, coating and/or filling are encountered in many fields of engineering, research, industry, trade and by hobbyists as well. This includes building construction both above and below ground as well as interior fitting; wood and plastics machining industries; automobile, ship and aircraft building; machine and apparatus building; electrical engineering, pattern- and tool-making and many fields of trade, such as, electrical and sanitary installation, assembly and repair.

A particular mode of application of these substances is in their use as a reactivatable adhesive and a compacting and levelling material for assembly and repair purposes. For example, with such an adhesive substance, attaching and securing members, such as, screws, anchorbolts can be set in holes and boreholes and bonded without any further mechanical securing means. With the same substances, flanges can be bonded and compacted.

A preferred form of application according to this invention is the use of activatable one-component substances in cases where they are not additionally compacted by the detectable destruction of microhollow spheres, but rather, retain the low specific gravity of the original formulation in the hardened and vulcanized condition. This is an important characteristic for adhesives, reacted resinous mortar, and compacting compounds for the building trades, automobile building, as well as for adhesive and levelling compounds.

Another preferred form of application on the basis of this invention is the use of dry powder mixtures and/or laminates that contain microencapsulated substances, stable microhollow spheres and/or conventional additives and which become activated by mechanical stress, such as, pressure, shearing, and rotational or torsional forces. Said powder mixtures may be based on inorganics, such as, cement, lime and/or organic building agents. The laminates are organic polymers and/or binding agents that can be processed by means of pressure, vacuum and/or heat.

According to the present invention, the activatable one-component substances are also useful in pattern- and tool-making. In this case, the relevant substances are such that they are barely plastic at room temperature but at slightly elevated temperatures they can, for example, be formed, kneaded, are activatable and, after depth-hardening, can be machined by cutting tools. They are, however, also suited for all other purposes in those applications wherein forces are encountered which are sufficient to activate the protective casing rupturing means.

A further preferred form of application for the reactivatable substances of the present invention lies in the production of molded, hollow and/or injection molded components. For example, in the field of reinforced plastics, preferably glass fiber reinforced polyester and other duromers and/or thermoplasts, the autoclave method, pressure vacuum method, pressure bag method, cold and hot molding techniques for processing the reactivatable one-component substances are available. Additionally, prefabricated, liquid, pasty, thixotropic, solid and/or powdery one-component systems lend themselves in a series of advantages for intermediate products as molded products and/or prepregs.

The one-component substances of the present invention exhibit homogeneous compositions, uniform reactivity, low pot or processing times, and can be stored for several months. In industrial engineering, commerce, trade artisan and the hobby field, there are a multiplicity of further possibilities of application for the activatable one-component substances of the present invention that cannot be individually specified here.

Thus, the one-component system of the present invention possesses, inter alia, the following advantages:
the known positive features of a two- or more-component substance in a one-component system,
easy application which is not subject to critical parameters since mixing of two or more components is not required,
absence of mixing errors,
easy and uniform activation,
no pot and processing times,
predetermined reactions, such as, gelling and hardening times,
nonadhesively adjustable deforming and/or kneading properties,
pumpable,
adjustable permanent viscosity and/or thixotropic values,
low shrinkage or shrinkage-free hardening and depth hardening,
reduction or hindrance of internal tension, fissures, and crack formation,
good storage stability,
reduction and/or elimination of physiological and toxicological hazards and/or environmental problems in the application and processing of dangerous materials.

The invention is explained in detail in the following examples, but it is not restricted to said examples.

The quantitative data and conditions given in the following examples refer to weight.

EXAMPLE 1

To prove the protective function of the microhollow spheres according to this invention in the production and storage of hardenable compositions containing microencapsulated material, substances were prepared as set forth in Table 1 hereof and the several components were homogeneously mixed in a planetary mixer. The prepared batches No. 2 and No. 3 each had the adequate proportional volume of glass pellets and/or microhollow spheres. The addition of the individual components was effected in the order set forth in the table.

TABLE 1

| Raw Material | Mixture #1 parts by wt. | Mixture #2 parts by wt. | Mixture #3 parts by wt. |
| --- | --- | --- | --- |
| UP resin[1] | 200 | 200 | 200 |
| peroxide microcapsules[2] | 20 | 20 | 20 |
| colloidal silicic acid | 2 | 2 | 2 |
| glass pellets[3] | — | 80 | — |
| microhollow spheres[4] | — | — | 24 |
| quartz sand 0.2–0.4 mm | 500 | 420 | 476 |
| rotations of mixing machine | 30 rpm | 30 rpm | 30 rpm |
| mixing time | 20 min. | 20 min. | 20 min. |
| Storage test results | | | |
| a) polymerization nests or pockets | 8 hrs. | 12 hrs. | none after 6 months |
| b) depth hardened | 35 hrs. | 48 hrs. | after 6 months no changes in rheological |

TABLE 1-continued

| Raw Material | Mixture #1 parts by wt. | Mixture #2 parts by wt. | Mixture #3 parts by wt. |
|---|---|---|---|
| | | | properties |

[1] highly reactive, unsaturated polyester resin, viscosity approximately 1000 cp, styrene content = 35%, acid number: 25
[2] 40% benzoyl peroxide in phthalate plasticizer microcapsule size: <200 mµ
[3] grain size: 250 mµ, bulk weight: 2.35 g/cm$^3$
[4] grain size: 250 mµ, bulk weight: 0.7 g/cm$^3$ The comparative mixing and storage tests show that in mixtures No. 1 and 2, microcapsular rupture took place during the mixing process and thus local polymerization reactions were initiated. After 8 to 12 hours, mixtures No. 1 and 2 presented hard localized polymerized cores that were only destroyable by application of pressure. The continued storage tests showed, after 35 to 48 hours, a complete depth-hardening, i.e., complete polymerization of the mixtures No. 1 and 2. Mixed batch No. 3 according to this invention showed no changes in rheological properties after 6 months of storage and could be worked and processed perfectly.

EXAMPLE 2

Another mixture in accordance with the present invention and containing microhollow spheres was compared with one containing glass pellets where the additions of the microhollow spheres and the glass pellets had been added in the same amount as shown in Table 2.

TABLE 2

| Raw Material | Mixture #1 parts per volume | Mixture #2 a + 2 b/parts per volume |
|---|---|---|
| UP resin[1] | 200 | 200 |
| peroxide microcapsules[2] | 20 | 20 |
| colloidal silicic acid | 2 | 2 |
| glass pellets[3] | 35 | — |
| microhollow spheres[4] | — | 35 |
| quartz sand 0.1–0.3 mm | 200 | 200 |
| rotations of mixing machines | 10 rpm | 10 rpm |
| mixing time | 30 min. | 30 min. |

[1,2,3,4] see Table 1

The revolutions of the mixing machines were reduced to avoid destruction of microcapsules in mixture No. 1.

Mixtures No. 1 and 2 a were placed in aluminum cans and sealed. Mixture No. 2 b was stored in a glass cylinder having a diameter identical to the aluminum cans and a metal stamp weight 57.75 g was placed on the top of the mixture. The weight of the metal stamp corresponded to the difference in weight due to the varying weights of the volume of glass beads or pellets and that of the microhollow spheres. Storage tests gave the results shown in Table 3.

TABLE 3

| Storage tests | Mixture #1 | Mixture #2 a | Mixture #2 b |
|---|---|---|---|
| Polymerization nests or pockets | 24 hours | 0 after 6 months | 0 after 6 months |
| Depth-hardened | 56 hours | after 6 months, mixtures 2 a and 2 b showed not change in rheological properties | |

EXAMPLE 3

The following two one-component filler compositions for automobile bodies were produced:

Filler Composition 1
  100 parts by weight UP resin[1]
  5 parts by weight titanium dioxide dye paste in plasticizer
  2 parts by weight microencapsulated N,N-dimethyl-p-toluidine,
    50% in phthalate plasticizer,
    grain size less than 100 mµ,
  10 parts by weight microencapsulated peroxide[2],
  10 parts by weight stable microhollow spheres,
    grain size 20–70 mµ$_3$
    bulk weight 0.21 g/cm$^3$,
  100 parts by weight talcum,
  20 parts by weight heavy spar,
  20 parts by weight fine talcum.
[1] and [2] see Table 1.

Filler Composition 2
The recipe of filler composition 1 was modified to the extent that in place of the 10 parts by weight of microhollow spheres, 40 parts by weight of talcum were used.

Both filling compositions were spread with a metal spatula under normal hand pressure in a uniform thickness layer on a degreased sheet of aluminum. In a second test, the filling compositions were spread on a degreased sheet of steel, in a layer 80 to 100 mµ thick. Composition No. 1 which, according to this invention contained stable microhollow spheres, was so hard after 30 minutes on both the aluminum as well as on the steel sheet, that the surface could be sanded with sandpaper. In this test, the sandpaper did not become clogged. After a further 10 minutes, composition No. 1 was depth-hardened on both surfaces. After 30 minutes, composition No. 2 was still soft and plastic on both metal surfaces and this condition did not change after an additional 120 minutes and after an entire day, the surface was still soft.

This comparison demonstrates that the stable microhollow spheres act as rupturing means for the protective casing in that they act as grinding and friction bodies when mechanical and/or physical forces are applied. Microscopic examination showed that the microhollow spheres had not been destroyed.

EXAMPLE 4

A dowel cementing substance of the following composition was formed:
  100 parts by weight of reaction resin solution[1],
  5 parts by weight of microencapsulated N,N-dimethyl-p-toluidine,
  20 parts by weight microencapsulated peroxide 40%, grain size less than 400 mµ,
  10 parts by weight microhollow spheres
    grain size 20–70 mµ,
  265 parts by weight microhollow spheres
    grain size 70–250 mµ.
[1] unsaturated polyester resin, 60% of 1,3-butandiol-dimethacrylate, viscosity approx. 1400 cp, acid number 24.

This dowel cementing substance was put into a bored hole of concrete Bn 350, that had been cleaned of dust. The bore hole had a screw depth of 10 d. In the bed of dowel cement, a screw M 10 was screwed in 8 d deep by means of a boring machine. After 10 minutes, the screw with an initial break-away torque of 400 cm kp was loosened and could be screwed out. A true-to-fit counter thread had been produced. Subsequently, the screw was again screwed into the hole, this time to 10 d and with a torque of 400 cm kp. After 60 minutes, the screw with an initial break away torque of 500 cm kp could be unscrewed. The initial break-away torque ($L_{MB}$) was 25% above the moment of the bolt and nut tension ($L_{MA}$) and thereby more than fulfilled the specifications demanded by practice, i.e., $L_{MB} \geq 1.2$ times $L_{MA}$.

The bore hole was cut open vertically and the perfect screw pitch produced by the dowel cement of this invention was apparent. The microscopic examination showed that no detectable destruction of the stable microhollow spheres had taken place.

EXAMPLE 5

The following polysulfide sealing compound was produced in a planetary mixer:

TABLE 4

| | Sealing Compounds | |
|---|---|---|
| Raw Materials | No. 1 parts by wt. | No. 2 parts by wt. |
| polysulfide polymer | 100 | 100 |
| plasticizer | 50 | 50 |
| chalk | 30 | 50 |
| titanium dioxide | 30 | 30 |
| sulfur | 0.2 | 0.2 |
| thixotropic agent | 3.8 | 3.8 |
| microencapsulated lead dioxide 50% in the plasticizer grain size <300 mµ | 15 | 15 |
| microhollow spheres grain size <300 mµ | 40 | — |
| revolutions of mixing machines | 30 rpm | 30 rpm |
| mixing time | 10 min. | 10 min. |

In sealing compound No. 2, after the mixing process, a weak brown coloring was observed, whereas the sealing compound No. 1 did not show such coloring. This brown coloring was caused by a partial microcapsule rupture which allowed lead oxide which serves as the hardener to be introduced into the composition.

Both polysulfide sealing compounds were subsequently pressed through a microcapsule destruction arrangement composed of a chopper and a worm conveyor. Sealing compound No. 1 produced from the extruding nozzle had a homogeneous brown color and was depth-hardened after approximately 90 minutes. Compound No. 2 showed only brown streaks after activation and was not depth-hardened after 12 hours.

The addition of stable microhollow spheres in compound No. 1 demonstrates their favorable protective casing rupturing effect. Furthermore, sealing compound No. 2 shows that the mechanically operating microcapsule destruction arrangement does not provide adequate destruction.

EXAMPLE 6

In a planetary mixer, the following epoxide resin adhesives were produced:

TABLE 5

| | Adhesive | |
|---|---|---|
| Raw Material | No. 1 parts by wt. | No. 2 parts by wt. |
| epoxide resin microcapsules+ grain size <200 mµ | 120 | 120 |
| polyamidoamine (hardener) | 100 | 100 |
| microhollow spheres, grain size <100 mµ | 30 | — |
| revolutions of mixing machine | 100 rpm | 100 rpm |
| mixing time | 15 min. | 15 min. |

+dyed red

Both adhesive mixtures were left standing for 24 hours. After this interval, adhesive No. 2 showed an increase in viscosity and a weak microcapsule sedimentation. Adhesive No. 1, which is in accordance with the present invention, did not exhibit this problem. Both adhesives were then spread on sandblasted sheet metal test pieces with an adhesive surface of 10 cm² and two adhesive coated surfaces for each sample were laid face-to-face. After 48 hours, the adhesive No. 1 showed a tensile shearing strength of 60 kp/cm², whereas adhesive No. 2, only showed a strength of 20 kp/cm². The fractured surface of the test specimen coated with adhesive No. 2 showed that it was still soft without crosslinked pockets of adhesive. Microscopic examination made it evident that only 50% of the epoxide resin microcapsules had been destroyed. On the other hand, on adhesive No. 1, the examination showed that the adhesive has been fully activated by its content of microhollow spheres.

EXAMPLE 7

An activatable kneading composition was produced according to the following recipe.

In a planetary mixer operating at a speed of 50 rpm, the following ingredients were mixed together:
- 100 parts by weight UP resin, 60% in neopentylglykoldimethacrylate, acid number 28, viscosity 2700 cp,
- 2 parts by weight magnesium oxide,
- 3 parts by weight grafted copolymer of polyethylene and methacrylic acid, methacrylic acid content 15%,
- 5 parts by weight colloidal silicic acid,
- 10 parts by weight stable microhollow spheres 21 70 mµ,
- 80 parts by weight stable microhollow spheres <200 mµ,
- 10 parts by weight titanium dioxide,
- 10 parts by weight microencapsulated peroxide, 40%, grain size <200 mµ.

This mixture thickened within 24 hours to such a degree that a kneadable substance resulted which possessed no surface adhesiveness. If this kneading substance were kneaded between the fingers, or a kneading board, it became activated by said kneading within 60 seconds. The activated substance became hard after 12 hours.

What is claimed is:

1. A hardenable composition comprising a hardenable monomeric, oligomeric, or polymeric component, a hardening agent therefore, wherein the hardenable component or hardening agent is contained in a reaction-hindering protective casing which can be ruptured by the usual pressure normally used in applying such compositions, and microhollow spheres which are of sufficient strength to withstand rupture by said normal pressure, the amount of said spheres being at least 1% by weight based on the weight of the hardenable component.

2. The composition of claim 1 wherein the microhollow spheres are formed from silicates.

3. The composition of claim 1 wherein the microhollow spheres are formed from glass, ceramic, or plastic.

4. The composition of claim 1 wherein the spheres are formed from thermosetting plastic.

5. The composition of claim 1 wherein the spheres have a diameter of less than about 3000 mµ.

6. The composition of claim 1 wherein the spheres have a diameter of less than about 1500 m$\mu$.

7. The composition of claim 1 wherein the spheres have a diameter of between 20 to 1000 m$\mu$.

8. The composition of claim 1 wherein the microhollow spheres have a specific gravity of less than 1.0 g/cm$^3$.

9. The composition of claim 1 wherein the microhollow spheres have a specific gravity of less than 0.8 g/cm$^3$.

10. The composition of claim 1 wherein the microhollow spheres have a specific gravity of between 0.1 and 0.8 g/cm$^3$.

11. The composition of claim 1 wherein the amount of microhollow spheres is from about 1% to 700% by weight based on the weight of the hardenable component.

12. The composition of claim 1 wherein the amount of microhollow spheres is from about 1 to 100% by weight based on the weight of the hardenable component.

13. The composition of claim 1 wherein the amount of microhollow spheres is from about 3 to 70% by weight based on the weight of the hardenable component.

14. The composition of claim 1 wherein the individual microhollow spheres have a volume from one to three times that of the protective casing.

15. The composition of claim 1 wherein the hardening agent is a reaction initiator, cross-linking agent, reaction accelerator or catalyst.

16. The composition of claim 1 wherein the hardening agent is selected from the group consisting of inorganic oxidizing agents, organic oxidizing agents, metal oxides, peroxy acids, peroxides, hydroperoxides, amines, imines, mercaptanes and azo compounds.

17. The composition of claim 9 wherein the hardening agent has a particle size of less than 1500 m$\mu$.

18. The composition of claim 1 wherein the composition further contains a filler selected from the group consisting of chalk, quartz, sand, talcum, and fibers.

19. The composition of claim 1 wherein the microhollow spheres or the protective casings are pretreated with compounds which form adhesive bridges selected from the group consisting of silanes and chrome complexes.

20. The composition of claim 18 wherein the microhollow spheres or fillers are treated with anti-chemisorption agents selected from the group consisting of fatty acids and derivatives thereof.

21. The composition of claim 18 wherein the microhollow spheres or fillers are coated with substances that reduce their coefficient of friction selected from the group consisting of hydrocarbons and graphite.

* * * * *